Oct. 23, 1956 C. S. GLENNY 2,767,894
BICYCLE BASKET
Filed Jan. 30, 1952
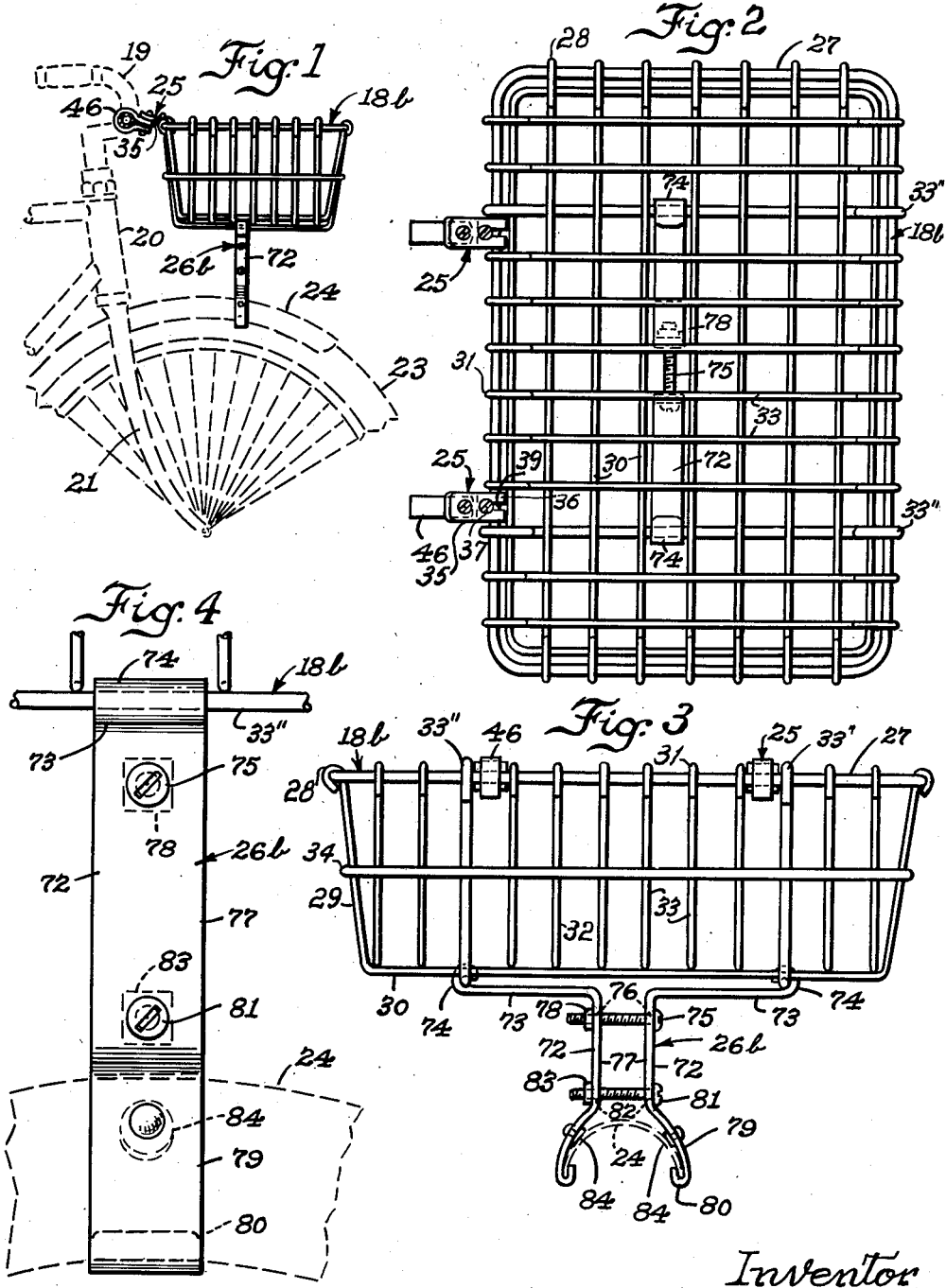
Inventor
Clarence S. Glenny

United States Patent Office 2,767,894
Patented Oct. 23, 1956

2,767,894

BICYCLE BASKET

Clarence S. Glenny, Rockford, Ill., assignor to The Washburn Company, Worcester, Mass., a corporation of Massachusetts Application January 30, 1952, Serial No. 269,037

3 Claims. (Cl. 224—36)

This invention relates to bicycle baskets and has for its principal object the provision of improved attaching means for the back and bottom of such baskets, enabling the more economical and better appearing construction of the basket itself of ordinary wire mesh throughout, without the costlier but unslightly sheet metal bands to which the attaching means were heretofore generally fastened, the present back attaching means being designed for neat and sturdy application to the wire top frame, and the present bottom attaching means being designed for neat and sturdy application to neighboring wires extending in a fore and aft direction in the bottom of the basket.

Another object of my invention is to provide attaching means for the back and bottom of the basket which are more readily adjustable relative to the basket to facilitate mounting the basket on the handlebar and front fender of a bicycle, regardless of the usual differences in design of handlebars and the anticipated differences in dimensions and designs of bicycles.

The invention is illustrated in the accompanying drawing, in which—

Fig. 1 is a side view of a bicycle basket made in accordance with my invention and shown mounted on the front of a bicycle;

Fig. 2 is a plan view of Fig. 1 on a larger scale;

Fig. 3 is a rear view, and

Fig. 4 is a side view of the bottom attaching bracket shown in Figs. 1 to 3.

The same reference numerals are applied to corresponding parts throughout the views.

Baskets of the kind herein shown are commonly used for carrying packages on bicycle handlebars, and, referring to the drawing, the basket designated by the reference numeral 18b is shown supported on the handlebar 19 of a bicycle, only a front portion of which is shown in dotted lines, 20 being the head, 21 the front fork, 23 the front wheel, and 24 the front fender. The present invention, as stated before, is particularly concerned with improved attaching means 25 for the back of the basket applicable to the handlebar 19, and improved attaching means 26b for the bottom of the basket applicable to the front fender 24, these two attaching means, as stated before, being so designed that the basket 18b can be of the most economical ordinary wire mesh construction, devoid of the usual costlier, and unsightly sheet metal bands that were generally provided heretofore either as part of or as an anchroage for the back and bottom attaching means. The basket 18b, it will be noticed, is of ordinary wire mesh construction and has a heavy wire top frame 27 to which the looped ends 28 of the upwardly extending end portions 29 of the longitudinally extending wires 30 are fastened at the two ends of the basket, and to which the looped ends 31 of the upwardly extending end portions 32 of the cross-wires 33 that extend in a fore and aft direction are secured at the front and back of the basket. A reinforcing frame 34 surrounds the upwardly extending end portions 29 and 32 at a mid-elevation and is welded to these wires at the intersections. A basket of such uniform all-wire construction is much neater in appearance than one of the old design having sheet metal bands applied thereto and is cheaper to manufacture.

The back attaching means 25, as best appears in Figs. 1 and 2, comprises a pair of generally J-shaped brackets 35, each of which has its looped end 36 straddling the wire top frame 27 and adjustably clamped thereto by means of a bolt 37 and nut 38, the bolt extending through registering ends of a slot 39 in the looped end portion 36. A lock washer 40 entered under the head of the bolt resists its turning in a loosening direction. The other end portion of the bracket 35 has a curved extremity 41 and also has a hole 42 provided therein in which a bolt 43 is entered and extends through registering holes 44 in the spaced ends 45 of a U-shaped handlebar clip or clamping band 46. A nut 47 is threaded on the projecting end of the bolt 43 to permit tightening the bolt 43 and contracting the band 46 into tight clamping engagement with the handlebar 19. Another lock washer 48 is provided under the head of the bolt 43, similar to the washer 40, for a similar purpose. With this construction, it should be evident that the back of the basket 18b can be supported at the same level with the handlebar 19, or slightly above or below that level, the two brackets 35 being pivotally adjustable relative to the wire frame 27 at their looped end 36 and the clamping bands 46 being pivotally adjustable about the handlebar 19 as a center. The brackets 35 are rigid with the frame 27 when the bolts 37 are tightened, and the upwardly curved extremity 41 on the other end portion of each bracket 35 serves by abutment with the associated band 46 to make the bracket 35 rigid with the handlebar 19 when the associated bolt 43 is tightened.

The basket 18b includes two heavy wires 33″ of the same weight as the wire top frame 27 for connection with the bottom attaching means 26b. The bottom attaching means 26b comprises two inverted generally L-shaped brackets 72, on the horizontal legs 73 of which there are hooked ends 74 for engagement on the cross-wires 33″ on the bottom of the basket between any pair of neighboring longitudinally extending wires 30, a bolt 75 being entered through registering holes 76 in the vertical legs 77 of the brackets 72 and having a nut 78 threaded on the projecting end thereof to draw the brackets toward each other and thereby tighten the hold of the hooked ends 74 on the wires 33″. The lower end portions 79 of the legs 77 are bent into diverging relation and have hooks 80 formed on the extremities thereof in which the edge portions of the front fender 24 can be received, so that the brackets 72 can be clamped onto the front fender when the bolt 81, that extends through registering holes 82 in the two legs 77 and has a nut 83 threaded on its projecting end, is tightened. Rubber bumper pads 84 are mounted in openings in the end portions 79 and engage the outer side of the fender 24 partly to provide a friction grip to prevent slippage and partly to protect the finish on the fender against marring by contact with the brackets and partly to prevent downward displacement of the brackets relative to the fender once the bolts 75 have been tightened, as indicated in Fig. 3. It should be evident that with this construction the brackets 72 may be applied to the bottom of the basket 18b farther forward or farther to the rear on the bottom of the basket to suit the needs of any particular installation.

It is believed the foregoing description conveys a good understanding of the objects and advantages of my invention. The appended claims have been drawn to cover all legitimate modifications and adaptations.

I claim:

1. A supporting and fender attaching bracket for application to the bottom of a bicycle basket having a wire mesh bottom wall, which includes spaced substantially parallel wires extending in a fore and aft direction, said bracket comprising inverted generally L-shaped right and left bracket members, the vertical legs of which are disposed in laterally spaced substantially parallel relation and the horizontal legs of which extend outwardly away from each other at the upper ends of the vertical legs, said horizontal legs having upwardly and inwardly bent hook-shaped outer end portions arranged to be detachably and adjustably engaged on certain of said fore and aft extending parallel wires at a selected location lengthwise thereof, said vertical legs having diverging lower end portions on the extremities of which are inwardly and upwardly bent hook-shaped portions arranged to be detachably and adjustably engaged on the opposed lateral edges of a bicycle fender disposed below the basket, and vertically spaced horizontal bolts connecting the vertical legs of said bracket members for drawing the bracket members toward each other as much or little at the upper ends as required for secure connection with the basket and as much or little at the lower ends as required for secure connection to the fender.

2. A bracket as set forth in claim 1, including bumper pads of compressible resilient material provided on the diverging lower end portions of said vertical legs at a predetermined distance upwardly from the hooked ends projecting inwardly for engagement on the opposite sides of the fender to protect the fender against marring contact with the bracket members and prevent downward displacement of the bracket members relative to the fender.

3. A supporting and fender-attaching bracket for application to the bottom of a bicycle basket having a wire mesh bottom wall, which includes spaced substantially parallel wires extending in a fore and aft direction, said bracket comprising inverted generally L-shaped right and left bracket members, the vertical legs of which are disposed in laterally spaced substantially parallel relation and the horizontal legs of which extend outwardly away from each other at the upper ends of the vertical legs, said horizontal legs having upwardly and inwardly bent hook-shaped outer end portions arranged to be detachably and adjustably engaged on certain of said fore and aft extending parallel wires at a selected location lengthwise thereof, said vertical legs having diverging lower end portions on the extremities of which are inwardly and upwardly bent hook-shaped portions arranged to be detachably and adjustably engaged on the opposed lateral edges of a bicycle fender disposed below the basket, and a horizontal bolt connecting the vertical legs of said bracket members for drawing the bracket members toward each other for secure connection to the basket and fender.

References Cited in the file of this patent

UNITED STATES PATENTS

| Number | Name | Date |
|---|---|---|
| 460,332 | Coates | Sept. 29, 1891 |
| 1,058,229 | Futhey | Apr. 8, 1913 |
| 1,510,805 | Smith | Oct. 7, 1924 |
| 2,010,479 | Dennis | Aug. 6, 1935 |
| 2,183,822 | Pawsat | Dec. 19, 1939 |
| 2,331,211 | Lyman | Oct. 5, 1943 |
| 2,351,858 | Ingalls | Jan. 20, 1944 |
| 2,413,772 | Morehouse | Jan. 7, 1947 |
| 2,541,640 | Dennis | Feb. 13, 1951 |
| 2,576,111 | Glenny | Nov. 27, 1951 |

FOREIGN PATENTS

| Number | Country | Date |
|---|---|---|
| 24,828 | Great Britain | Nov. 9, 1907 |